SELECTIVE SIGNALING RECEIVER

Filed May 29, 1963 3 Sheets-Sheet 1

INVENTORS G.W. DICK
W.D. FARMER
P.S. KOPEL
BY Charles Scott Phelan
ATTORNEY

SELECTIVE SIGNALING RECEIVER

Filed May 29, 1963 3 Sheets-Sheet 3

United States Patent Office 3,309,670

Patented Mar. 14, 1967

3,309,670

SELECTIVE SIGNALING RECEIVER

George W. Dick, Morris Township, Morris County, and Wayne D. Farmer, Plainfield, and Paul S. Kopel, Somerset, N.J., assignors to Bell Telephone Laboratories, Incorporated, New York, N.Y., a corporation of New York Filed May 29, 1963, Ser. No. 284,030

13 Claims. (Cl. 340—164)

This invention relates to electrical signaling systems and, more particularly, to selective signaling receivers including counting circuits controlled by pulse generators at the receivers in order to afford substantially unrestricted use of code digits for identification of such receivers.

Signaling systems in which a transmitter common to many receiver stations selectively alerts or calls a single station from such a group of stations have become standard equipment for modern industry. Requirements of such selective signaling systems in modern industry have been met by a large variety of receivers responsive to coded ringing signals in the form of telephone dial pulses or discrete radio frequencies. In any method of operation which affords a common transmitting station selective supervision and control of a single receiver from among large numbers of receivers, economic operation, accuracy, and reliability are essential factors.

It has been recognized as desirable in many industrial systems to employ receiver stations adaped to respond to digits generated by a standard telephone dial, which is relatively simple, rather than employing receivers which respond to some other types of special codes which may involve complex equipment at the transmitting station. Standard telephone dial-digit generators are readily available and easily adaptable for operation in the transmitter of such industrial systems. One drawback of such dial-digit generators, however, is that they produce substantially more pulse bits for each digit or item of information than do the generators for most special codes. As a consequence of the need for many encoding pulses many prior art decoding devices for dial-coded numbers required a large number of relays. Such relays consumed much power and loaded down the lines serving such stations to the extent that only very few stations served by a common control point could be provided with signals sufficiently precise in magnitude and shape that the receiver stations' discriminating margins were satisfied.

An example of a prior art system employing a receiver for dial digits is disclosed in Patent 3,012,226 by H. H. Abbott, issued Dec. 5, 1961. The Abbott system stored the received digits in a magnetic counter which required considerably less power and presented less load to the lines than other prior art systems. The Abbott system was, nevertheless, limited in its station handling capacity due to inflexibility in handling dial-coded address information in a single counter. Such inflexibility and its resulting capacity limitation stems from the requirement that station identifying numbers be painstakingly chosen in a manner to avoid assigning any station an identifying digit that is the sum of the digits of other stations' identifying numbers. Assume, for example, that in the Abbott system three stations are assigned the identifying station numbers 1–265, 1–355 and 1–445. This assignment prevents the use of any number from the group of identifying numbers 1–852 through 1–859, to mention only one of such groups, since dialing of the two digits 1–8 in the Abbott system totals the same amount as the first three digits of the previously-mentioned individual stations' code numbers. Thereafter, upon the subsequent dialing of the digit 5, all three stations 1–265, 1–355, and 1–445 are rung prior to the completion of a call to any station in the group of identifying numbers 1–852 through 1–859.

Today's industry is expanding in the direction of automation; and with improvements in the number of low power circuits available today, it is advantageous that one control station serve as many receiving stations as possible without materially increasing the transmitting equipment at the control station. It is essential, therefore, that unrestricted use of identifying numbers be achieved so that more receiver stations than heretofore possible may be connected to a common transmitting station. Further, it is essential that each receiver station be capable of responding to its own unique number without the possibility existing that a plurality of stations would be erroneously activated by the control transmitter, in the manner described hereinbefore.

Accordingly, it is an object of this invention to greatly increase the flexibility in numbering assignments afforded a transmitting station so that essentially unrestricted use of identifying numbers for selectively alerting a single station of a plurality of stations served by the one transmitting station can be achieved.

It is a further object of this invention to increase the number of receiver stations served by a common transmitting station and yet afford desired accuracy and operating margins for each receiver station, so that each receiver is capable of detecting its own identifying number from essentially all identifying numbers available through the unrestricted use of telephone-dial-coded digits.

These and other objects are attained in one specific illustrative embodiment of selective receiving stations using Gill selectors in our invention, in which telephone-dial-coded digits representing address numbers are monitored in each receiver by an address pulse counting circuit. The latter circuit counts each pulse of an incoming address number and assumes a ready condition for indicating, upon interrogation, whether or not a predetermined permutation of address pulses has been received. In addition, each receiver employs a digit counting circuit for counting each significant digit of the dial-coded address number, which counter assumes a ready condition to initiate the interrogating operation after a predetermined number of digits have been received.

Employment of two counters in the manner just described allows essentially unrestricted use of standard dial-coded pulses representing the address digits 1 through 9. This factor materially increases, over prior art dial-coded systems, the possible number of receiver stations which can be controlled by one transmitting station because, with the present invention, all dial digit combinations may be used. For example, the increase in the station handling capacity of our invention over a prior art receiver of the type disclosed by Abbott, using the assumptions of a standard telephone dial for producing one digit as a "start," or "index," digit followed by N significant digits, and with no provisions for conference codes, may be calculated as shown in Table 1.

TABLE 1

| Number of N Significant Digits | Prior Art System Station Capacity | Instant System Station Capacity |
|---|---|---|
| 2 | 53 | 81 |
| 3 | 217 | 729 |
| 4 | 711 | 6561 |
| 5 | 2117 | 59049 |

Thus, in the standard method of operation, in which an index digit is followed by three significant digits, the dial-coded system of our invention handles approximately three times as many stations as prior art dial-coded systems.

Accordingly, it is a feature of our invention that a receiver station, which responds only to its own unique dial-coded address number, counts respectively the number of digits in a received address number and the number of pulses representing these digits and interrogates the pulse counting circuit after only a predetermined number of digits have been counted.

It is another feature of our invention that a selective signaling receiver station employs a digit counting shift register and a pulse counting shift register driven by a tandem connection. This tandem connection, which includes an advance and read-out circuit for the digit counting shift register and a clear and read-out circuit for the pulse counting shift register, coincidentally initiates the delivery of signal indications that a predetermined number of received digits has defined a desired permutation of address pulses.

It is yet another feature of our invention that a selective signaling receiver station employs a pulse counting shift register which, upon interrogation only following reception of the predetermined number of digits, signals the receipt of a desired permutation of address pulses.

It is still another feature of our invention that a digit responsive pulse generator is employed to produce output pulses during only intertrain pauses between trains of telephone-dial-coded pulses representing digits of a receiver station identifying number. These output pulses are employed to advance the count of a digit counting shift register and are further employed to selectively clear a pulse counting shift register. Coincident output signals from these two registers indicate the reception of the correct address code for this receiver station.

It is a further feature of our invention that a logic circuit is connected between a digit counting shift register and a pulse counting shift register and is responsive to the coincident output of both shift registers during an intertrain pause following receipt in the station of a correct number of dialed digits and a correct permutation of address pulses to activate a utilization circuit.

The invention and the above-noted objects and features thereof will be understood more clearly from consideration of the following detailed description together with the accompanying drawings in which.

Figure 1:
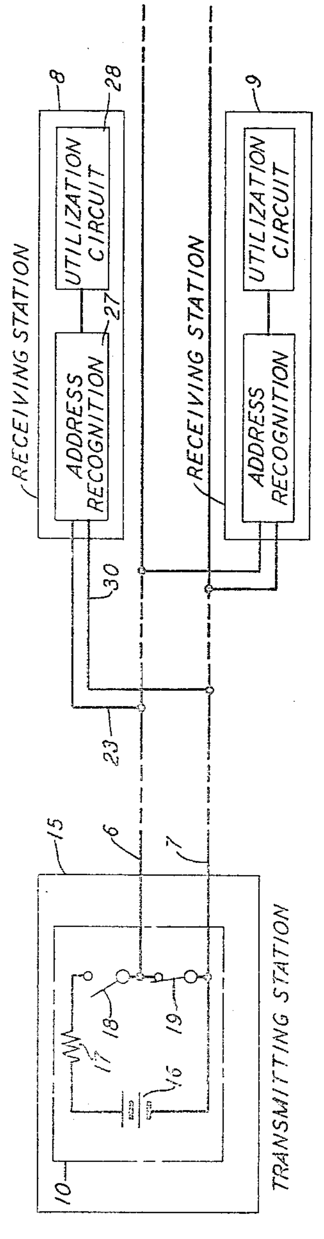
FIG. 1 depicts in block diagram form a single information transmitting station serving two of a plurality of receiving stations in which the subject matter of this invention may advantageously be utilized.

Turning now to the drawings, the block diagram shown in FIG. 1 depicts a single transmitting station 15 serving a plurality of receiving stations by an outgoing line 6 and a return line 7. Only two receiver stations 8 and 9 are shown connected in parallel across lines 6 and 7, although it is to be understood that the number of receiver stations which could be served by a single transmitter is limited only to the capacities indicated in Table 1. Although the receiving stations in FIG. 1 are shown primarily adapted for wire communications common in certain industrial telephone systems, radio or other communication media could be employed in the illustrative embodiment of this invention.

The transmitter 15 is capable of generating essentially unrestricted combinations of identifying address signals and delivering them to the receiver stations connected in parallel to lines 6 and 7. All the receivers so served are initially alerted by a start, or index, digit, and thereafter each receiver must pick out its own unique number and activate its utilization circuit. These address signals are in the form of pulse trains, each of which represents a particular digit of a numbering system by having a number of separate pulses equal to that digit amount. Each digit, or train of pulses, is followed by an intertrain pause of duration greater than the interpulse pauses. Thus, at the transmitting station any generator meeting these requirements would suffice. For example, a standard telephone dial 10, shown in dashed lines in the transmitting station 15, may advantageously be such a typical identifying number generator.

The dial pulse generator 10 of FIG. 1 includes a normally closed switch 19 and a normally open switch 18, which represent contacts on a standard telephone dial mechanism. When the dial is wound, switch 18 closes and remains closed while the dial unwinds. As the dial unwinds switch 19 opens and closes to form the dial pulses. When the dial returns to normal, switch 18 returns to its normally open condition and switch 19 returns to its normally closed condition.

In the absence of a dial pulse being generated by transmitting station 15, lines 6 and 7 are shunted by the closed switch 19. The dial pulse generator 10 further includes a potential source 16 and a limiting resistor 17 which cooperate with the switch 18 and the switch 19 to form the dial pulses as shown, for example, in FIG. 3.

With respect to FIG. 3, a pulse, such as 101, which represents the index digit, is generated in the following manner: (1) The closure of switch 18, as the dial is wound up, applies positive potential from source 16 to line 6 of FIG. 1; but no pulse appears since lines 6 and 7 remain shunted by closed switch 19; (2) as the dial unwinds, switch 19 opens to form the leading edge of pulse 101; and after a time interval $T_1$ in FIG. 3, switch 19 closes to form the trailing edge of pulse 101; and (3) when the dial returns to normal, switches 18 and 19 return to their normally open and closed conditions, respectively.

Figure 3:
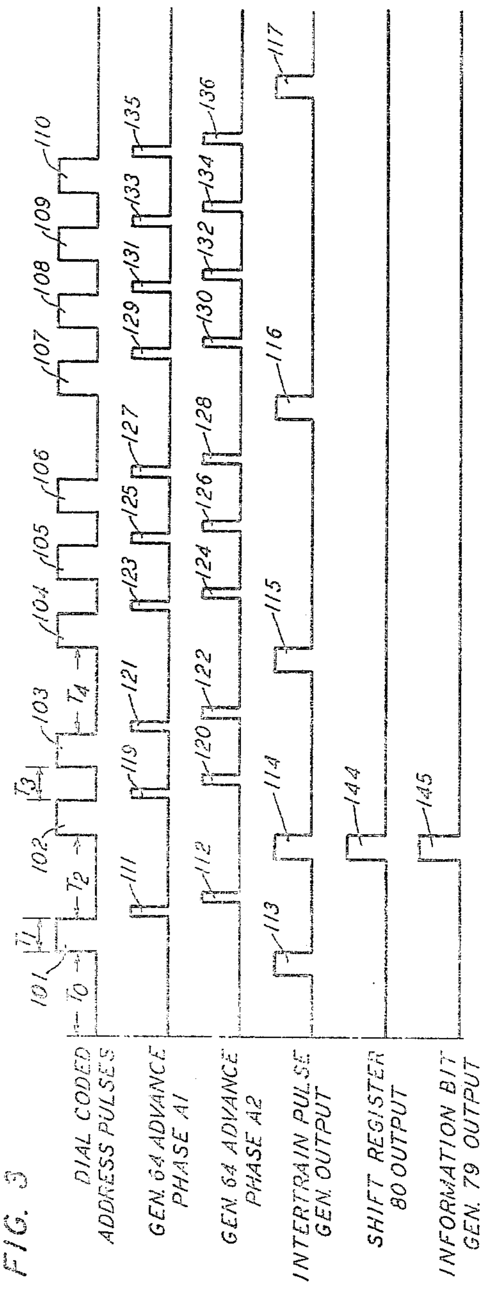
FIG. 3 shows pulse trains useful in illustrating the circuit operations involved in a signal receiving station of this invention.

The dial pulse 101 may be, for example, about 50 milliseconds in duration and is approximately equal in duration to the interpulse spacing $T_3$ depicted between pulses 102 and 103 of FIG. 3. The latter pulses represent the first significant identifying digit, namely, the digit 2. $T_2$, the intertrain pause shown between pulses 101 and 102, varies in time duration in accordance with the particular portion of the dial on which the identifying numbers are located and on the speed of the operator. In some equipment the intertrain pause intervals $T_2$ are not variable but are of a standard fixed duration. Our invention is adapted to respond equally well to either type of dialing pulses so long as the intertrain pause duration $T_2$ is somewhat greater than the time interval $T_3$ between successive pulses in a train representing an identifying digit. Advantageously the intertrain time intervals are approximately 100 milliseconds or twice as long as the interpulse intervals.

Address pulses, such as the ones shown at line 1 of FIG. 3, are received by the receivers of FIG. 1 which are connected in parallel to the lines 6 and 7. These receivers each have two distinct portions shown for ease of understanding as the address recognition portion 27 and the utilization circuit portion 28. The address recognition portion 27 must respond only to its own unique code. For purposes of explanation, it is assumed that the receiver 8 of FIG. 1 has an address recognition portion 27 adapted to respond only to the identifying number 1–234, as shown at line 1 in FIG. 3. The other receivers associated with the lines 6 and 7 have address recognition portions adapted to respond to identifying numbers other than 1–234.

In any receiver, the receipt of an identifying number, correct both in the desired permutation of address pulses and the proper number of pulse trains, will enable the address recognition portion to activate a utilization circuit for the particular receiver. Utilization circuits associated with the various receivers of FIG. 1 may advantageously be, for example, any prior art alarm circuit capable of responding to low level output signals. Or, such a utilization circuit may take the form of a transistor or other suitable device which would be employed to complete a circuit or perform a function such as controlling a valve or other equipment.

Figure 2:
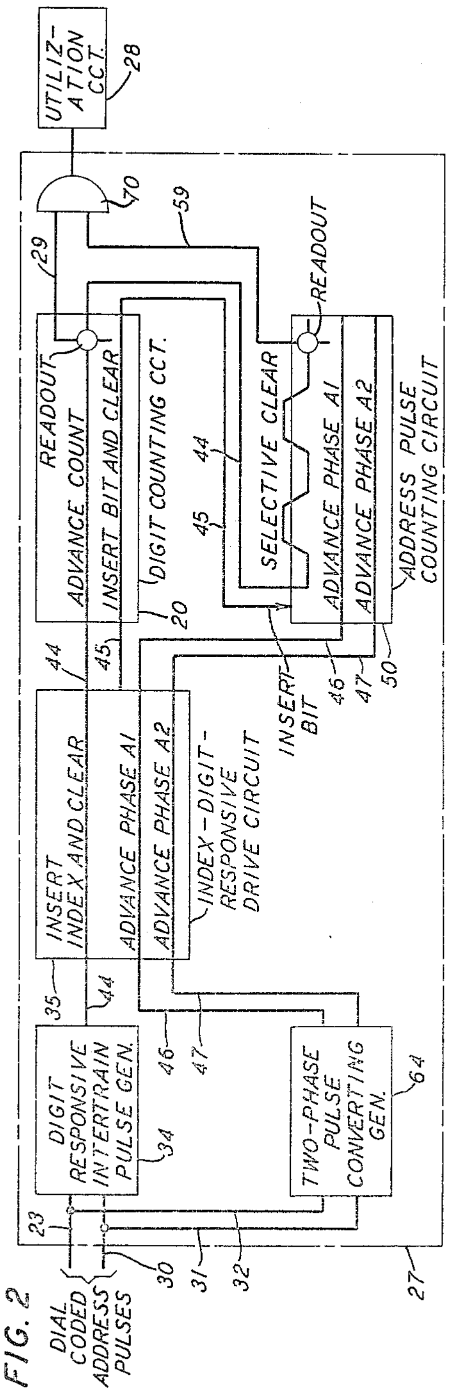
FIG. 2 depicts in functional form the signal receiving address recognition circuit of one receiver shown in FIG. 1.

FIG. 2 depicts a functional block diagram of a typical address recognition circuit of our invention. The block diagram of FIG. 2 may be, for example, the address recognition circuit 27 employed in the receiver station 8 of FIG. 1. This address recognition circuit 27 receives address pulses applied to the send and return lines 6 and 7 by transmitting station 15 over leads 23 and 30 which connect the receiver station 8 to the lines 6 and 7. A brief summary of the functions of the block diagram circuits of FIG. 2 is in order prior to a more detailed discussion thereof.

The received address pulses are applied by leads 23 and 30 to two pulse generator circuits 34 and 64 shown in FIG. 2. These pulse generator circuits convert the received address pulses into output signals which control a starter drive circuit 35 and the counting circuits 20 and 50 during a decoding process for the incoming address code. This starter drive circuit 35 and the counting circuits 20 and 50 are explained in greater detail hereinafter with respect to FIG. 4 following an outline of their functions in connection with FIGS. 2 and 3.

Energy for activating both the intertrain pulse generator 34 and the two-phase pulse converting generator 64 is supplied by the aforementioned address pulses. Pulse generator 34 is digit responsive in that it produces an output during only the intertrain pause following each received address digit.

The intertrain pulse generator 34 is a delayed pulse generator of the type fully described and claimed in an application filed of even date herewith in the name of G. W. Dick entitled, "A Single-Transistor Pulse Circuit" now Patent No. 3,188,497 issued on June 8, 1965. Reference is made to the above-identified application for a detailed explanation of the intertrain pulse generator 34. Briefly, however, the generator 34 is pulsed to a ready condition by every address pulse received but does not produce an output indication unless the free time interval following the trailing edge of an input pulse exceeds by a fixed interval the time duration of the interpulse interval. Thus, an output is produced only during the latter portion of an intertrain pause which follows the termination of a complete train of dial pulses representing an identifying digit.

Pulse generator 64, which also receives the aforementioned address pulses, is a two-phase generator which converts each received address pulse into two distinct and separate output pulses. The two-phase pulse converting generator 64 is shown in block diagram form in FIG. 2 and will be described in detail with respect to FIG. 5 hereinafter. Briefly, however, the two-phase converter generator 64 may advantageously comprise two standard oscillating circuits arranged such that the input of each oscillator receives each dial pulse via leads 31 and 32 which connect the generator 64 with the incoming address input leads 23 and 30. Each of the two oscillators produces a distinct output pulse for each dial pulse received. In accordance with different resistance and capacitance values selectively chosen for the oscillators, the output pulses are spaced in time and are generated during the interpulse and intertrain intervals following the trailing edge of the various dial pulses.

Outputs from both generators 34 and 64 are connected to a starter drive circuit 35. Starter drive circuit 35 includes a shift register which may be any prior art type. In one practical embodiment, a shift register was used which was of the type shown in FIG. 12 of an article entitled "Integrated Magnetic Circuits for Synchronous Sequential Logic Machines" by U. F. Gianola, and appearing in volume 39, Issue No. 2, of the Bell System Technical Journal. Direct current priming was employed in that embodiment and, in addition, a clear circuit was provided in a manner well known in the art so that a single pulse in the clear circuit would set the first stage in a first binary condition, and reset all other stages to a second binary condition. In the schematic representation of FIG. 2 herein, a lead 44 is the clear circuit and applies clear pulses to starter drive circuit 35 from intertrain pulse generator 34. The prime circuit is not shown in FIG. 2.

The two circuits 46 and 47 supply two phases of advance pulses to starter drive circuit 35 in the manner taught by Gianola, and these pulses are derived from the generator 64. In accordance with the present invention, the circuits 44, 46, and 47 extend through and beyond starter drive circuit 35 to other shift registers wherein the pulses in the circuits 44, 46, and 47 are further utilized to perform advancing and clearing operations in a manner which will be discussed.

Figure 4:
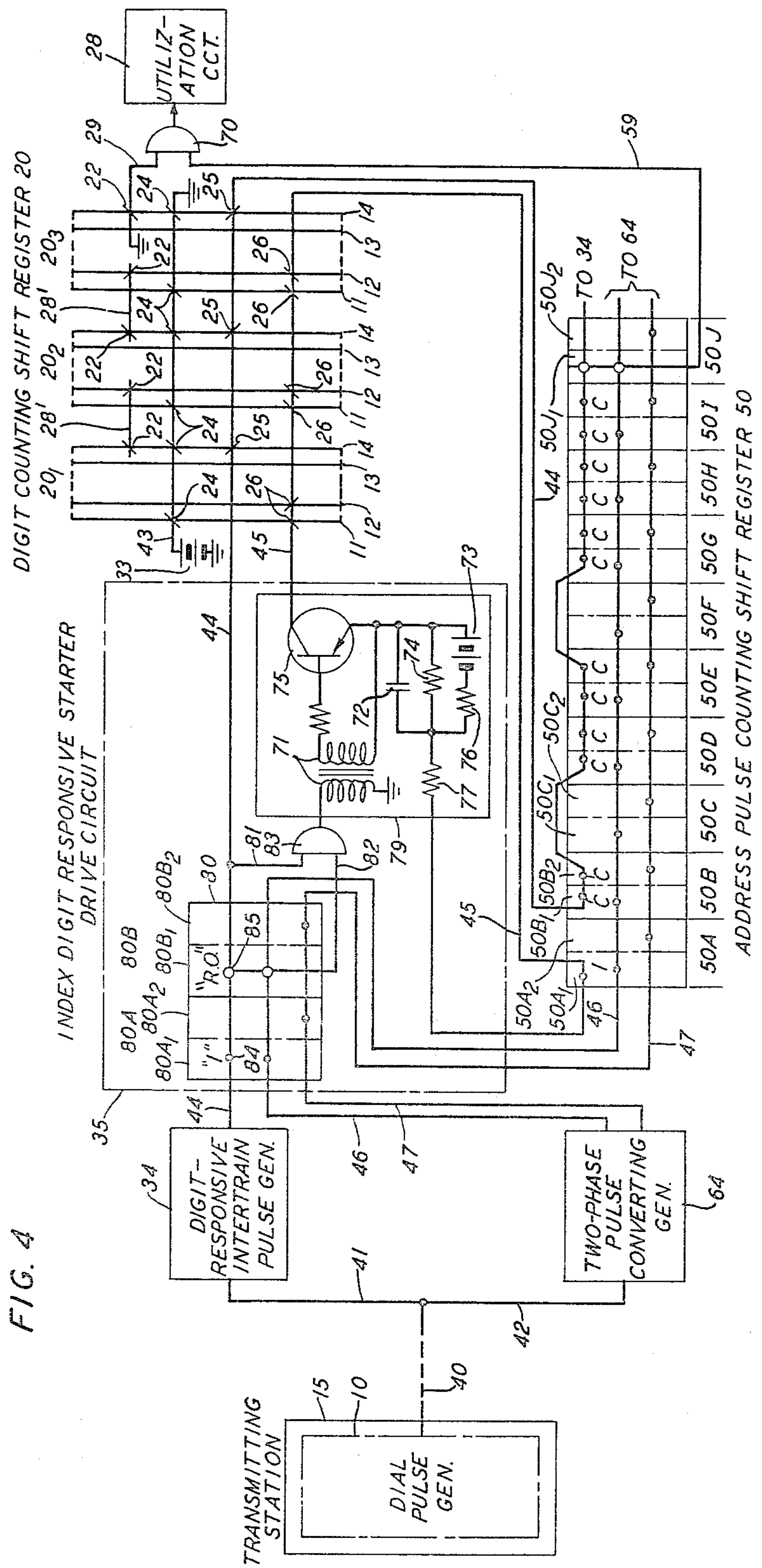
FIG. 4 is a combined block diagram and schematic representation depicting one specific illustrative embodiment of a signal receiving station of this invention.

The function of starter drive circuit 35 is to place an information bit in both counters 20 and 50 only when a new address signal to be decoded is received by the circuit of FIG. 2. To achieve this function, starter drive circuit 35 includes a logic gate and a pulse generator circuit which are shown in FIG. 4 and will be described therewith. Briefly, however, this gate and generator cooperate with the shift register in starter drive circuit 35 in order to respond to only the sequence of output control pulses produced by pulse generators 34 and 64 when an index digit is received thereby. After an index digit has been received, the pulse generator of the starter drive circuit 35 inserts an information bit via lead 45 in the first stage of counter 20 and clears the remaining stages thereof. An information bit is also placed in the first stage of counter 50. The starter drive circuit thereafter remains inactive until another index digit of a new address signal is received.

Digit counting shift register 20 is also of a prior art type, as described in copending application having Ser. No. 163,338, filed Dec. 29, 1961 by N. D. Newby, and modified slightly in the manner fully described hereinafter with respect to FIG. 4. This shift register 20 is adapted to count each significant digit of the address code. This counting by shift register 20 is controlled by the intertrain output pulses from digit responsive generator 34 which appear on lead 44 after they have passed through the shift register circuit of starter drive circuit 35. Each intertrain pulse on lead 44 advances the information bit one count for each significant digit of the address code. When the last significant digit of an address code is counted, the digit counting shift register 20 pulses AND gate 70 as shown symbolically by read-out lead 29 coupled to lead 44 from intertrain pulse generator 34.

Address pulse counting shift register 50 is adapted to count the number of pulses in each significant digit of the address code. This shift register is also known in the prior art and may advantageously be of the magnetic core type described in the Gianola article mentioned hereinbefore in connection with the shift register of starter drive circuit 35. In this case, however, the first stage is initially set to a predetermined "first" binary condition by an output on lead 45 from starter drive circuit 35. Furthermore, lead 44 links some but not all of the remaining stages of register 50 to supply clear signals for resetting such stages to a "second" binary condition. Advance signals are supplied to register 50 by leads 46 and 47.

Shift register 50 utilizes a known selective clearing operation, disclosed in the Abbott patent mentioned hereinbefore, in which certain stages associated with the address digits of the instant receiver station are not cleared during an intertrain pause since clearing lead 44 is not passed through these stages. When the initially inserted information bit reaches the stage at which read-out lead 59 intersects clear lead 44, a read-out signal to AND gate 70 is provided during a clearing operation. This read-out signal is indicative of a correct address for this receiver only if it and a read-out signal from digit counting circuit 20 occur coincidentally. In such a case, AND gate 70 activates utilization circuit 28 to indicate that a proper dial-coded address number for this station was received.

In order to provide a basis for a more detailed explanation of the address recognition circuit of FIG. 2, it is assumed that this circuit is adapted to respond to the dial-coded address number 1–234. The standard telephone dial-coded address pulses representing the number 1–234 are shown in FIG. 3 and are generated by dial pulse generator 10 in the manner described hereinbefore with respect to the transmitting station 15 of FIG. 1.

In FIG. 3 advance phase A1 pulses are the output pulses from one of the oscillators of pulse generator 64 which has its component values chosen to produce an output a short interval subsequent to the trailing edge of each input address pulse. For example, in FIG. 3 pulse 111 is an advance phase A1 output resulting from index digit 101 and occurring during the intertrain interval $T_2$. The outputs from the remaining oscillator circuit of pulse generator 64, such as pulse 112, occur subsequent to, and spaced in time from, the advance phase A1 outputs and are labeled in FIG. 3 as advance phase A2. Pulses occurring in the advance phases A1 and A2 will hereinafter be designated simply as A1 and A2 pulses.

Output pulses from the intertrain pulse generator 34 are shown in FIG. 3. It should be understood that pulse 101, the index digit address pulse of number 1–234, was preceded by a prior code which was separated from code 1–234 by an intertrain pause of duration $T_0$. This intertrain pause $T_0$ preceding pulse 101 allows sufficient time duration for pulse generator 34 to produce an output pulse 113 which is the first intertrain pulse generator output shown in FIG. 3. An output pulse 114, resulting from the index digit address pulse 101, is shown during the latter portion of the intertrain interval $T_2$. Pulse 102, the first address pulse of digit 2, also triggers generator 34 into a ready condition, but no output pulse is produced until the appearance of an intertrain pause following address pulse 103 of the digit 2. The output pulse 115 is produced by intertrain generator 34 in the intertrain pause $T_4$ following the digit 2.

Output pulses 113 and 114 for intertrain pulse generator 34 and the A1 and A2 pulses 111 and 112 from pulse generator 64 are delivered to the starter drive circuit 35 via leads 44, 46, and 47, and control the operation thereof. The intertrain pulse 113 from generator 34, via lead 44, inserts an index digit in the first portion of starter drive circuit 35 and clears the remaining portion of the circuit. This clearing operation places the starter drive circuit 35 in a ready condition such that, upon the subsequent appearance of the A1 pulse 111, the A2 pulse 112; and the second intertrain pulse 114, the starter drive circuit 35 is operated and delivers an output pulse to each of the counters 20 and 50 via lead 45.

This output pulse from starter drive circuit 35 inserts, in digit counting circuit 20, an information bit in its first stage and clears its remaining stages in the manner previously described. Counting circuit 20 is thereby placed in a ready condition to receive the outputs from pulse generator 34 via lead 44. This counter advantageously is adapted to accomplish a count equal to the number of significant identifying digits for its particular receiver station and then to read out by pulsing AND gate 70 via lead 29. For example, under the assumption that the address recognition circuit of FIG. 2 responds to the number 1–234, the shift register 20 is advanced one unit, or count, for each of the intertrain output pulses 115, 116 and 117 shown in FIG. 3, following each of the significant digits 2, 3, and 4 of the dial-coded address 1–234. Intertrain pulse 117 which follows the last significant digit of the address 1–234 causes the pulse counting shift register 20 to read out to logic gate 70.

The same previously mentioned output pulse on lead 45 from index-digit-responsive starter drive circuit 35 inserts an information bit in shift register 50. Leads 46 and 47, which pass through starter drive circuit 35, also pass through the pulse counting shift register 50 and are employed therein to advance the information bit one count for each pair of A1, A2 pulses representing a received address pulse. Lead 44 from intertrain pulse generator 34 is employed in the pulse counting shift register 50 for clearing stages thereof which are representative of incorrect address numbers for this receiver station. The stages of shift register 50 which represent a correct number for this receiver station are selectively omitted from the clearing operation so that if the initially inserted index information bit is shifted to one of these selected correct-digit stages an intertrain pulse which occurs following this count will not clear out the information bit. If, on the other hand, the information bit is shifted to an improper stage for this receiver station, then the next following intertrain pulse produced by pulse generator 34 on lead 44 clears out the information bit and the decoding operation in the pulse counting shift register 50 ceases.

From the foregoing discussion it should be understood that all receiver stations served by a common transmitter and responsive to dial-coded address numbers including three significant digits, employ a digit counting shift register in each station which will count these three digits and pulse a coincidence logic gate. Similarly, all such receivers will have an address pulse counting circuit, with selective clearing adapted for each station's own unique number, for counting the number of address pulses in each of the significant digits. For each unique dial-coded address number transmitted by the transmitting station, however, only one receiver will coincidentally obtain a correct count in both counting circuits and thereby satisfy an AND gate in order to actuate a utilization circuit at that receiver. In all the remaining receivers, although the digit count may be correct, the count in the address pulse counting circuit will fit either of two situations, which are not correct.

The first incorrect pulse counting situation which can occur is that the count falls short of the required total count and the selective clearing operation in the address pulse counting circuit will remove the information bit therein and no read out to the AND gate controlling the utilization circuit will occur. In the second incorrect situation the total count will be obtained by a lesser number of digits than the required number of digits and, although a read out from the address pulse counting circuit will occur, it occurs prior to the read out from the digit counting circuit, and the utilization circuit again is not activated.

Examples of both of these situations may be appreciated by assuming that the circuit of FIG. 2 receives dial-coded address pulses 1–232 and 1–272. In the example of code 1–232 the first described situation occurs in which the count falls short of the required count. Decoding of the digits 1–232 proceeds in the manner described hereinbefore for the circuit of FIG. 2, except that the last count in address pulse counting circuit 50 falls short by two units. An intertrain pulse following the last digit 2 in address 1–232 clears out the information bit from counting circuit 50 and no read out occurs since a count that is proper for the station 1–234 is not achieved.

In the case of digits 1–272, a total address pulse count for station 1–234 is made upon the receipt of only two significant digits, namely the digits 27. Thereafter, upon the appearance of an intertrain pulse, the address pulse counting shift register 50 reads out. In this case, however, only two significant digits have been received, rather than the required three significant digits, so the digit pulse counting circuit 20 does not read out. Thus, in this situation also, only one input is delivered to AND gate 70 and the utilization circuit 28 is not activated.

An illustrative embodiment of our invention is shown in the combined schematic and block diagram of FIG. 4 in which the details of the starter drive circuit 35, the digit counting shift register 20, and the address pulse counting shift register 50 are shown. In FIG. 4 the transmitter 15, the intertrain pulse generator 34, and the two-phase pulse converting generator 64 are shown merely in block form. Prior to tracing the steps achieved by the embodiment of FIG. 4 in recognizing its unique address signal 1–234, a brief reference to FIG. 5 will describe how the A1 and A2 pulses of the two-phase generator 64 are produced.

Figure 5:
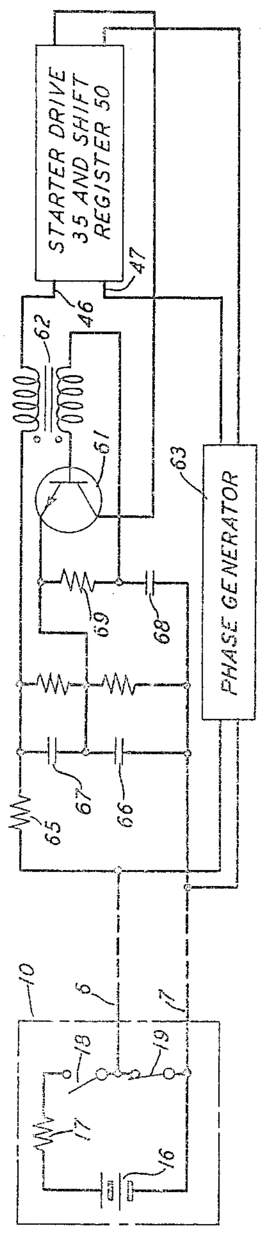
FIG. 5 is a circuit diagram of a pulse generator circuit shown in block form in FIGS. 2 and 4.

In FIG. 5 the dial pulse generator 10 of transmitter 15 of FIG. 1 is repeated and shown connected directly to the two-phase pulse converting generator 64 by send line 6 and return line 7. The leads 23, 30, 31 and 32, FIGS. 1 and 2, which connect the pulse generator 64 with the lines 6 and 7, have been omitted in FIG. 5 in the interest of clarity. Generator 64 comprises two blocking oscillators, which are identical, except for different resistance and capacitance values. Thus, only one is shown in detail, it being understood that the block diagram 63 in FIG. 5 labeled PHASE GENERATOR would be identical to the oscillator shown, but possessing a different oscillatory period, so that the leading edge of its output pulse is produced subsequent in time to the trailing edge of the output pulse produced by the oscillator shown in detail.

During the intertrain pause $T_0$ preceding the index digit 101, FIG. 3, switch 18 of dial pulse generator 10 of FIG. 5 is open, and switch 19 is closed, thereby shunting out lines 6 and 7. During this interval capacitors 66, 67, and 68 are at ground potential. Since no source of bias for transistor 61 is present, transistor 61 is in a nonconductive condition, and no current can flow in the output lead 46. During the interval $T_1$ of FIG. 3, when the index pulse 101 is present, switch 18 of dial pulse generator 10 is closed, and switch 19 is open. Positive potential from source 16 is thereby applied to line 6 through the limiting resistor 17 and closed switch 18. During this interval $T_1$, capacitors 66, 67, and 68 commence to charge to the terminal potential of source 16 in the dial pulse generator 10. The charging time of capacitor 68 is chosen long enough, as compared to the charging time of capacitor 66, that the base of transistor 61 is held negative with respect to the emitter. This charging condition holds transistor 61 nonconductive during the time interval $T_1$. During the free time following the termination of digit 101, switch 19 in dial pulse generator 10 re-establishes a shunt across lines 6 and 7, and capacitors 66 and 67 discharge through this shunt and resistor 65. Discharging of capacitors 66 and 67 is rapid, as compared with the slower discharge of capacitor 68 through the resistor 69. Shortly after initiation of the discharge process, a forward bias is established on the emitter-base junction of transistor 61, and it becomes conductive. Current flow in the base of transistor 61 from this conductive condition couples a signal through the feedback transformer 62 to develop across the secondary winding thereof a voltage which rapidly drives transistor 61 fully conductive.

This fully conductive condition in transistor 61 results in a low emitter-collector impedance condition, which condition completes a discharge path for capacitor 67. This discharge path is from the top plate of capacitor 67 through one winding of transformer 62, the output lead 46, a load comprising starter drive circuit 35 and shift register 50, and the emitter-collector path of transistor 61 back to the lower plate of capacitor 67.

Since the capacitors 66 and 67 discharged only a small amount prior to transistor 61 becoming fully conductive, capacitor 67 still has a relatively high charge. This charge of capacitor 67 is discharged through the load in the form of a pulse 111. Initially, during the discharge process through the load, a buildup of a magnetic field on transformer 62 produces a voltage across the emitter-base junction of transistor 61 to drive it into saturation. However, as the energy of capacitor 67 is dissipated through the load, the voltage across transformer 62, in typical oscillator action, produces a back bias across the base-emitter junction of transistor 61. This back bias turns off transistor 61, and it remains off during the remaining portion of intertrain interval $T_2$ of FIG. 3 until another input address dial pulse 102 appears. Thereafter the described operation is repeated, and another A1 output pulse 119 is generated. A2 pulses 112 and 120, which follow and are spaced in time from A1 pulses 111 and 119 respectively, are generated by phase generator 63 which operates in a manner similar to that just described.

Returning once again to FIG. 4, the operations achieved by the illustrative embodiment of our invention, in recognizing its own unique code, may be traced. In order to trace this operation, and in accordance with the description given hereinbefore with respect to FIG. 3, it is assumed that the transmitter 15 controls the dial pulse generator 10 located thereat to produce the address number 1–234 for the station of FIG. 4. The address number is delivered to the station of FIG. 4 by lines 6 and 7 which are shown combined as lead 40 in the interest of clarity.

It was mentioned hereinbefore that the starter drive circuit 35 responds only to a sequence of two intertrain pulses separated by an A1 and an A2 pulse, which sequence occurs only on the receipt of an index digit following a previous code. The manner in which the starter drive circuit 35 responds only to this particular sequence may be understood by reference to the details of the starter drive circuit 35 shown within the dashed lines of FIG. 4.

Starter drive circuit 35 includes a two-stage shift register 80 having a lead 44 from the intertrain pulse generator 34 and leads 46 and 47 from pulse generator 64 passing therethrough. An AND gate 83 is connected between an information bit generator 79 and the shift register 80. Input pulses for AND gate 83 are delivered from the intertrain pulse generator 34 via leads 44 and 81 and from shift register 80 via read-out lead 82.

Shift register 80 is of the prior art type, disclosed in the Gianola article mentioned hereinbefore, which employs a combined insert and clear operation by a pulse on lead 44 and a two-phase advance operation by pulses on leads 46 and 47. One pulse on lead 44 sets the shift register by establishing a first binary condition in the first stage and clearing the remaining stage. Two advance pulses, one each on leads 46 and 47, advance this first binary condition to the second stage. At this second stage a read-out operation is performed by another pulse on lead 44. The read out is a signal applied on lead 82 which is coupled to lead 44. These leads 44, 46 and 47 pass through two stages 80A and 80B each of which is divided into two parts as indicated by the solid lines divided by a dashed line. Black dots on leads 44, 46, and 47 in the stages of 80A and 80B symbolically indicate that a pulse on a lead performs a set or advance operation in the stage where the dot is located. For example, dot 84 on lead 44 in the section $80A_1$ of stage 80A has a "one" associated therewith indicating that a pulse on lead 44 inserts a "one" or first binary condition in this section of stage 80A. Circle 85 in section $80B_1$ of stage 80B has an abbreviation "R.O." associated therewith indicating that, if a "one" is present in section $80B_1$ of stage 80B, a pulse on lead 44 will read out a "one" via lead 82 to AND gate 83. Similarly the dots on leads 46 and 47 in stage 80A indicates that if a "one" is present in the section of the stage in which they appear, a pulse thereon shifts the "one" into a succeeding stage section.

In accordance with the above description, pulse 113, FIG. 3, from intertrain pulse generator 34 prior to the reception of code 1–234, sets a "one" in section $80A_1$ of stage 80A and clears the remaining stages. It will be clear from the explanation following hereinafter that it would be impossible for a "one" to be in section $80B_1$ of stage 80B at this time, and thus no read out by pulse 113 occurs. Upon receipt in the receiver station of the index digit 101, FIG. 3, in the manner described hereinbefore, the two-phase generator 64 converts the index pulse 101 into two A1 and A2 pulses 111 and 112, and intertrain generator 34 produces an output signal 114 during the intertrain pause $T_2$. The pulses 111 and 112 on leads 46 and 47 shift the "one" from section $80A_1$ of stage 80A of shift register 80 into section $80B_1$. The intertrain pulse 114, FIG. 3, reads out the information bit from section $80B_1$ of stage 80B, and output pulse 144, FIG. 3, is delivered to the AND gate 83 via lead 82. This pulse 144, which appears coincidentally with the intertrain pulse 114, satisfies AND gate 83, and an output signal is delivered to the information bit generator 79.

It should be noted that with a "one" resting in section $80B_1$ either an intertrain pulse or an A1 pulse will read out the "one" from this stage. But, if an A1 pulse were to read out the information, which happens only if a digit greater than an index digit is received, then only one input pulse would be present at AND gate 83. In such an instance its input conditions would not be satisfied, and the starter drive circuit operation would not proceed further.

An output signal from AND gate 83 appears across a primary winding of transformer 71 of information bit generator 79 and is inductively coupled to the secondary winding of transformer 71 in a polarity which is proper to establish a forward bias for a transistor 75. Transistor 75 is any suitable amplification device which conducts heavily upon being forward biased by a low signal applied to its base or control electrode. A PNPN triode device such as is known in the art to be analogous to a thyratron may be employed. In the information bit generator 79 a capacitor 72 is charged to a potential determined by potential source 73 and resistors 74 and 76. When a forward bias for transistor 75 is established across transformer 71, transistor 75 conducts and will remain conductive as long as the charge on capacitor 72 supplies a sufficient sustaining voltage across the transistor. When the charge on capacitor 72 is reduced to the point where the current therefrom drops below the sustaining current level of transistor 75, the transistor will return to its nonconducting state.

During the conductive interval of transistor 75, an output pulse 145, FIG. 3, is generated by the discharge of the capacitor 72 through the discharge path of lead 45. This discharge path includes the low emitter-collector impedance of transistor 75, lead 45, which passes through all stages of digit counting shift register 20 and a section $50A_1$, of stage 50A of pulse counting shift register 50, and limiting resistor 77 which is connected to capacitor 72 to complete the discharge path.

Shift register 20 is of the type shown in FIG. 1 of the aforementioned Newby application and includes three transfluxor stages $20_1$, $20_2$, and $20_3$. Each stage is a three-aperture transfluxor defining four magnetic paths, or legs, 11, 12, 13, and 14. The transfluxors are illustrated in the conventional mirror symbology utilized by Newby and wherein vertical lines represent flux paths, horizontal lines represent electric circuits associated therewith, and short diagonal lines at intersections of horizontal and vertical lines represent a coupling between the circuit and path. The slant direction of the diagonal lines represents winding polarity at the coupling.

Lead 45 is the reset circuit for register 20 and is coupled to legs 11 and 12 of each stage to put all the stages in a predetermined condition when a pulse appears on the lead. The reset circuit coupling for register 20 herein is adapted to set stage $20_1$ to the binary "one" condition and the other stages to the binary "zero" condition as indicated by the coupling representations in the drawing. This is the sole change from the Newby circuit wherein the reset circuit placed all of the stages in the same condition.

Leg 14 of each stage in register 20 is coupled to leg 12 of the next succeeding stage by a coupling circuit 28′. Lead 44 is coupled to leg 14 of each stage for supplying advance pulses in the form of intertrain pulses from generator 34. A direct current priming circuit 43 continuously carries priming current from battery 33 and is coupled to legs 11 and 14 of each stage in register 20. The priming current magnetically biases each stage as described by Newby, and as known in the art, so that an advance pulse on lead 44 causes any stage in the "one" condition to produce an output via its circuit 28 to shift the next stage to the "one" condition. However, the driving stage is not itself switched out of the "one" condition.

Shift register 50 employs the same symbology described hereinbefore with respect to shift register 80 of the starter drive circuit 35, in that each stage is shown by solid lines and is divided into two sections by a dashed line. Dots on leads 44 through 47 in shift register 50 indicate that a specific function is accomplished within the stage where they are located by a pulse on the associated lead. For example, the pulse 125 on lead 45 places a "one" in section $50A_1$ of stage 50A wherein a black dot on lead 45 appears. In shift register 50, as is the case in shift register 80, a pair of advance pulses on leads 46 and 47 shift a "one" binary condition one full stage. Lead 44 in shift register 50 is employed for a selective clear operation in that a pulse on lead 44 operates to clear a "one" out of the selected stages through which the lead 44 is passed. This selective clear operation is symbolically indicated by the letter "C" associated with black dots on lead 44.

A pulse on lead 44 can also read out a "one" binary condition to AND gate 70 via lead 59 provided that the inserted bit is shifted to the first portion of stage 50J without resting in a cleared stage during a selective clearing operation. As is the case in shift register 80, an A1 pulse on lead 46 can also read out a "one" from stage 50J, but such a read out is not accompanied by a read-out signal from shift register 20. A single read out is indicative of the reception of an incorrect address pulse permutation for this receiver station. This alternative read-out capability for the first portion of stage 50J is symbolically shown by lead 59 intersecting leads 44 and 46 at the circles in section $50J_1$.

The cooperation of digit counting shift register 20 and address pulse counting shift register 50 will be clearly understood by considering the operational steps occurring upon reception of the dial-coded address number 1–234. It was previously described that starter drive circuit 35 responds solely to the index digit by establishing pulse 145 on lead 45. Since the starter drive circuit 35 is inactive during the reception of the significant digits 2, 3, and 4, it may be ignored during the remaining explanation.

In the manner described hereinbefore, the pulse 145 on lead 45 inserts a "one" in stage $20_1$ of shift register 20 and clears stages $20_2$ and $20_3$ thereof by establishing these stages in a "zero" condition. This same pulse on lead 45 also inserts a "one" in section $50A_1$ of stage 50A of address pulse counting shift register 50.

Upon reception of the address pulses 102 and 103 for the first significant digit 2, as shown in FIG. 3, a pair of A1, A2 pulses, 119 and 120, is generated by pulse generator 64 for the first address pulse 102 of digit 2. These pulses 119 and 120 advance the information bit in section $50A_1$ one full stage to the first section $50B_1$ of stage 50B. Thereafter pulses 121 and 122 generated by pulse generator 64 for the second address pulse 103 of digit 2 advance the information bit a second full stage to section $50C_1$. When the information bit is present in stage 50C, it is resting in a correct stage for the receiver station of FIG. 4 and is not cleared out during a selective clear operation, as will be explained following a consideration of the functions achieved in shift register 20 up to this point.

In shift register 20, during the period in which the A1, A2 pulses described in the operation of shift register 50 are generated, current from prime source 33 on lead 43 accomplishes the prime operation mentioned hereinabove. This prime operation places legs 13 and 14 in stage $20_1$ in a flux pattern ready to establish another "one" in stage $20_2$ when an advance pulse is received by shift register 20. The advance pulses for shift register 20 are applied by intertrain pulse generator 34 via lead 44. For example, reference to FIG. 3 shows that an intertrain pulse 115 is generated by pulse generator 34 during the intertrain pause $T_4$ between address pulses 103 and 104 of digits 2 and 3, respectively. This pulse 115 reverses the flux conditions in legs 13 and 14 of stage $20_1$, which reversal is carried over into stage $20_2$ by coupling lead 28', and thereby establishes a flux pattern in stage $20_2$ indicative of another "one" binary condition. With stages $20_1$ and $20_2$ of shift register 20 in a binary "one" condition, it is indicative of reception in the receiver station of FIG. 4 of an index digit and one significant address digit.

In shift register 50 the intertrain pulse 115 on lead 44 is utilized as a selective clear pulse. This pulse 115 does not clear out the information bit from stage 50C of shift register 50 during its appearance since lead 44 is not passed through this stage. Thus, the decoding operation in shift register 50 can continue upon reception of the next significant digit in the receiver station of FIG. 4.

Following the intertrain pulse 115, the A1, A2 pulses 123 through 128 are generated for address pulses 104 through 106 which represent the digit 3. These A1, A2 pulses advance the information bit in pulse counting shift register 50 three full stages, so that the information bit is in section $50F_1$ of stage 50F. This stage represents the digit 3 and is correct for the receiver station of FIG. 4, and thus a pulse on lead 44 cannot clear this stage. Thus, intertrain pulse 116 generated in the intertrain pause following the digit 3 does not clear out the information bit from stage $50F_1$ from the address pulse counting shift register 50.

Intertrain pulse 116 in shift register 20 is employed as an advance pulse in the manner described to place a "one" binary condition in the final stage $20_3$ of shift register 20. This "one" condition in stage $20_3$ fills the shift register 20 with "one" binary conditions, thereby indicating that only the last significant digit, 4, of dial-code address number 1–234 remains to be decoded.

Address pulses 107 through 110 of the last dial-coded address digit 4 are converted into four pairs of A1, A2 pulses, 129 through 136, FIG. 3, by pulse generator 64 and are employed in the described manner to shift the information bit in shift register 50 four full stages. Following this final shifting operation, the information bit in shift register 50 rests in stage 50J at section $50J_1$.

Intertrain pulse generator 34, following the last digit 4, produces intertrain pulse 117 on lead 44. This pulse 117 in digit counting shift register 20 switches leg 14 of the final stage $20_3$, which switching establishes a read-out pulse signal on lead 29 associated with winding 22 on leg 14 of stage $20_3$. Simultaneously pulse 117 reads out a "one" in the form of a pulse signal on lead 59 from stage 50J of address pulse counting shift register 50. These coincident read-out signals from digit counting shift register 20 and address pulse counting shift register 50 indicate that a dial-coded address number, which is correct in its address pulse permutation and correct in the number of digits in this permutation has been received by the receiver station of FIG. 4. These coincident read-out signals are delivered to AND gate 70 via leads 29 and 59. AND gate 70, in turn, in response to these outputs is satisfied and thereby delivers an output signal in order to activate the utilization circuit 28.

Examples of the selective clearing operations in shift register 50 for possible incorrect digit situations which may occur are hereinafter noted. In the first situation, assume that the significant digit received by the station of FIG. 4 after reception of digits 1 and 2 is for some other receiver station; i.e., it is a digit other than the digit 3 of this receiver station. The operation in the circuit of FIG. 4 proceeds in the described manner for the digits 1 and 2. Thus, during the clearing operation following the digit 2, the sole circulating information bit in section $50C_1$ of shift register 50 is not cleared. Assuming that the next significant digit is the digit 6, six A1, A2 pulse pairs for this incorrect digit advance the information bit in shift register 50 to section $50I_1$ of stage 50I. This stage, of course, is an incorrect stage for the receiver of FIG. 4. Thereafter a pulse, generated by intertrain pulse generator 34 during the intertrain pause following the incorrect digit 6, appears on clear lead 44 and selectively clears the information bit from stage 50I as indicated by the symbology therein. Upon the removal of the information bit from shift register 50, decoding therein ceases.

In the second incorrect digit situation which may occur, assume that the significant digit received by the station of FIG. 4 after reception of digits 1 and 2 is a digit 7. In this situation the index information bit in shift register 50 is advanced upon receipt of the digit 2 to stage $50C_1$ where it is not cleared during the clearing operation. Thereafter it is advanced by the A1, A2 pulse pairs resulting from the seven address pulses of the digit 7 to section $50J_1$ of stage 50J. Stage 50J is the read-out stage of shift register 50 and an intertrain pulse appearing on lead 44 following the digit 7 will read out and deliver a signal to AND gate 70 via lead 59. In this instance, however, since only two significant digits have been receiver by the station of FIG. 4, only one input is present at AND gate 70. Digit counting shift register 20 requires three significant digits as described hereinbefore prior to its delivery of a read-out signal via lead 29 to AND gate 70. Utilization circuit 28 therefore will not be activated since AND gate 70 is not satisfied. In a similar manner, if the second significant digit were greater than the digit 7, say, for example, digit 8, then the information bit is advanced to section $50J_1$ upon receipt of the seventh one of the eight address pulses representing the digit 8. An A1 pulse by pulse generator 64, resulting from the eighth address pulse from the digit 8, also reads out a signal via lead 59. Once again, however, utilization circuit 28 is not activated since only one input is delivered to AND gate 70.

The final incorrect digit situation which need be noted occurs when an information bit, as a remanent of a prior code, rests in an uncleared stage at the start of a decoding process for a new station identifying number. In accordance with the operation described hereinbefore, only one information bit is shifted in address pulse counting shift register 50 during one decoding operation. It is clear, therefore that this remanent information bit must be removed for proper decoding of the incoming address number to take place. A remanent information bit could exist in an uncleared stage of shift register 50, if the digits 1–23 were dialed and the call thereafter abandoned prior to the dialing of the final digit. In such a situation the remanent information bit rests in section $50F_1$ of stage 50F and the intertrain pause following the dialed digit 3 does not remove this information bit. Reception of the index digit of the new incoming address identifying number is converted by pulse generator 64 into an A1, A2 pulse pair on leads 46 and 47 passing through shift register 50. These A1, A2 pulses shift the remanent information bit one full stage to section $50G_1$ of stage 50G. Thereafter, the intertrain pulse during the intertrain interval between the index digit and the first significant digit of the new incoming dial-coded address identifying number clears out this remanent information bit. Simultaneously, the starter drive circuit is satisfied in the manner described hereinbefore, and it places an information bit in stage $50A_1$ of shift register 50 and, in addition, achieves a combined insert bit and clear operation in shift register 20. Thereafter, the decoding operation for the significant digits which follow is repeated in the manner described hereinbefore.

It is to be understood that the above-described arrangements are illustrative of the application of the principles of our invention. Numerous other arrangements may be devised by those skilled in the art without departing from the spirit and scope of this invention.

What is claimed is:

1. A signal receiving apparatus having an input circuit for receiving trains of pulses, said apparatus comprising
   a first counter having a plurality of stages,
   means connecting said pulse train input circuit to said first counter for causing said first counter to register the number of pulses in said trains of pulses,
   means connected to said input circuit and generating a further pulse after each of said pulse trains,
   a second counter connected to said further pulse generating means to register said further pulses,
   reset means coupling said further pulses to selected stages of said first counter, and a coincidence gate connected to said first and said second counters for producing an output signal in response to a coincidence of read-out signals from said first and said second counters.

2. A signal receiving apparatus for receiving trains of pulses, said apparatus comprising
   a first counter,
   pulse train applying means,
   means connecting said pulse train applying means to said first counter for causing said first counter to register the number of pulses in said trains of pulses,
   means connected to said pulse train applying means for generating a further pulse after each of said pulse trains, including the last train of said pulses defining a permutation of address pulses,
   a second counter,
   a control circuit connecting said second counter to said further pulse generating means for causing said second counter to advance its count one unit for each of said further pulses, said control circuit being connected in tandem to said first and second counters and being utilized in said first counter to clear all register numbers in said first counter except those numbers defining a desired permutation of address pulses,
   a read-out circuit coupled to said control circuit for said first and second counters,
   said read-out circuit being responsive to a pulse from said further pulse generating means only after reception of the last train of said pulse trains defining said permutation of address pulses.

3. In a signal receiving apparatus having an input circuit for receiving trains of pulses each being separated by intertrain pauses and each being the code representation of a digit of a numbering system, the combination comprising
   a digit responsive pulse generator circuit connected to said input circuit,
   an address pulse converting generator connected to said input circuit,
   a digit counting shift register, and an address pulse counting shift register,
   an information bit generator drive circuit connected to said digit responsive and pulse converting generators, said drive circuit having a counter activating output lead connected to said digit and address pulse counting shift registers in tandem,
   an advance circuit connecting said address pulse converting generator to said address pulse counting register,
   a control circuit connecting said digit counting shift register to said digit responsive generator for causing said register, in response to outputs from said digit responsive generator, to count the number of digits,
   said control circuit being connected in tandem to said address pulse counting register and said digit counting register and being utilized in said pulse counting register to clear all register stages except those defining a desired permutation,
   a utilization circuit,
   and a logic gate connected between said utilization circuit and said digit counting and address pulse counting shift registers and responsive to the coincidence of outputs therefrom.

4. A signal receiving apparatus having an input circuit for receiving a start pulse followed by a permutation of address pulses defined by trains of pulses each train being separated by intertrain pauses and being the code representation of a digit of a numbering system, said apparatus comprising
   a pulse counting shift register,
   means connecting said input circuit to said pulse counting shift register for causing said shift register to count each pulse of said input pulse trains,
   a digit counting shift register capable of registering a count equal to the number of digits in said permutation of address pulses,
   means generating an intertrain pulse following each of said digit representing pulse trains,
   means connecting said intertrain pulse generating means to said digit counting shift register for causing said shift register to count said further pulses, the last-mentioned means being further connected to said pulse counting shift register and being utilized therein for causing said pulse counting shift register, in response to said further pulses, to register reception of a predetermined permutation of address pulses,
   and an interrogation circuit coupled to said address pulse and digit counting shift registers and associated with said last-mentioned connecting means for interrogating said address pulse counting circuit after only said count equal to the number of digits in said permutation of address pulses is registered in said digit counting shift register.

5. A signal receiving apparatus having an input circuit for receiving a start pulse separated in time by an intertrain pause from a permutation of address pulses defined by trains of pulses, each train being separated from another by intertrain pauses and each train being the code representation of a digit of a numbering system, said apparatus comprising
   a digit responsive pulse generator connected to said input circuit for generating an output pulse during each intertrain pause following a train of digits,
   an address pulse converting generator connected to said input circuit for generating two time-spaced output pulses for said start pulse and each of said address pulses,
   an information bit generator drive circuit connected to said digit responsive generator and said pulse converting generator and responsive only to the sequence of output pulses resulting from said start pulse received thereby for producing a signal on an output lead,
   a digit counting shift register and an address pulse counting shift register, said address pulse counting shift register having stages therein corresponding to each possible digit of said address permutations, means connecting said shift registers in a series circuit with said output lead of said information bit generator and responsive to an output signal therefrom for causing said shift registers to assume a condition ready for counting, means connecting said digit counting shift register to the output of said digit responsive pulse generator for counting the output pulses generated thereby, said output connecting means being connected in tandem to said digit counting shift register and said address pulse counting shift register and being utilized to selectively clear stages in said pulse counting shift register corresponding to digits of address permutations other than a predetermined one for said receiver, means connecting said pulse converting generator to said address pulse counting shift register for causing said shift register to count the number of pulses in said train of pulses, and utilization means connected to said first and second counters and responsive to the coincidence of outputs therefrom.

6. A selective address recognition circuit having means for receiving trains of pulses delivered from a remote point and having intertrain pauses of a time duration greater than the time duration between pulses in said trains, each of said pulse trains being the code representation of a digit of a numbering system, said circuit comprising a first counter, means connecting said pulse train receiving means to said first counter for causing said first counter to register the number of pulses in said trains of pulses, means connected to said pulse train receiving means for generating an intertrain pulse for each digit received at said circuit, a second counter, intertrain pulse applying means connecting said intertrain pulse generator to said first and second counters, said second counter being responsive to said intertrain pulse generator for registering the number of said intertrain pulses, read-out means in said counters responsive to a pulse from said intertrain pulse generator subsequent to receipt of a correct address number in said recognition circuit for delivering coincident output signals, and utilization circuit activating means connected to said read-out means and responsive to said coincident output signals therefrom.

7. An electrical signaling system having a remote station for transmitting a series of pulses introduced by a single starter pulse and grouped into trains of pulses by pauses between said trains of pulses, each of said pulse trains being a code representation of a digit of a numbering system, said signaling system having a plurality of receiving stations having inputs connected in common to said remote station, each of said receiving stations comprising an address recognition system adapted to respond to the starter pulse common to all of said stations and to a unique combination of digits chosen independently of other station digit combinations, each of said address recognition systems comprising a pulse generating means, pulse train applying means connected between said pulse generating means and said receiving station input, said pulse generating means being responsive to said pulse trains for generating a control pulse for each intertrain pause received thereby, a first and a second counter, counter activating means connected between said counters and said pulse generating means and responsive to a control pulse generated thereby subsequent to receipt therein of said starter pulse, means connecting said pulse train applying means to said first counter to register the number of pulses in said trains of pulses, means connecting said pulse generating means to said second counter to cause said second counter to register the number of said control pulses, output indication applying means connected to said counters and coincidentally activated by a control pulse generated by said pulse generator subsequent to receipt in said system of a unique and predetermined code representation, and alarm activating means connected to said first and second counters and responsive to the coincident activation of said output indication applying means by said last-mentioned control pulse.

8. An electrical signaling system in accordance with claim 7 wherein said counter activating means comprising a third counter connected to said pulse generating means and said pulse applying means for registering only said starter digit, an information bit generator connected to said first and second counters for delivering an output when actuated, and coincidental logic circuit means connected between said third counter and said information bit generator and responsive to an output from said third counter and to said pulse from said pulse generating means appearing in the intertrain pause subsequent to said starter digit for activating said information bit generator.

9. An electrical signaling system in accordance with claim 8 wherein said coincidental logic circuit is connected to said third counter by a read-out means, said read-out means being located at a stage in said third counter circuit for maintaining said information bit generator inactive during the receipt in said address recognition system of code representations other than said single starter pulse.

10. In a selective address recognition circuit the combination comprising input means for receiving from a remote control point trains of pulses having intertrain pauses of a time duration greater than the time duration between pulses in said trains, each of said pulse trains being the code representation of a digit of a numbering system, a first counter, means connected between said input means and said first counter for converting each of said pulses in said pulse trains to one pair of separate and time-spaced advance pulses, said first counter being responsive to pairs of said advance pulses for registering the number of pulses in said trains of pulses, means connected to said input means for generating an intertrain pulse during the pause following each train of said trains of pulses, a second counter, means connecting said intertrain pulse generating means to said first and second counters, said second counter being responsive to said intertrain pulses for registering the number of intertrain pauses following said trains of pulses.

read-out means connected to said first and second counters and coincidentally responsive to the registering therein of a predetermined number of pulses and a predetermined number of said intertrain pulses, and utilization means connected to said read-out means of said first and second counters and responsive to the coincidence of output indications therefrom.

11. A selective address recognition circuit comprising input means for receiving trains of pulses having intertrain pauses of a time duration greater than the time duration between pulses in said train, each of said pulse trains being the code representation of a digit of a numbering system, a first and a second counter, first means connected between said second counter and said input means for converting each pulse in said pulse trains into two distinct spaced pulses, second means connected to said first and second counters and to said input means for generating an intertrain pulse during the intertrain pause after each of said trains of pulses, a starter circuit having an output lead connected to said counters and having input leads connected one each to said first and second means, said starter circuit being controlled by said first and second means, upon receipt in said input means of a single pulse preceded and followed by an intertrain pause, for placing an information bit in each of said first and second counters, said starter circuit including means for maintaining said starter circuit inactive during the receipt in said input means of code representations other than said single pulse, and utilization circuit means connected to said first and second counters and responsive to the coincidence of outputs therefrom.

12. In an address recognition system having an input means for receiving from a remote transmitting point dial-coded pulse trains each being code representations of digits of a numbering system and having intertrain pauses of a time duration greater than interpulse pauses, the combination comprising a pulse generating means connected to said input means, said pulse generating means comprising a first pulse generator for producing two separate and spaced advance pulses for each dial pulse received and a second pulse generator for producing a pulse during each intertrain pause subsequent to the latest pulse in time generated by said first pulse generator, a starter circuit having a plurality of input leads and a single output lead, means connecting one each of said starter circuit input leads to said first and second pulse generators, means in said starter circuit responsive to receipt therein of one of said intertrain pulses followed by two of said advance pulses and another one of said intertrain pulses for delivering an output indicative of an index digit received in said address recognition system, a first counter and a second counter, means connecting said first and second counter circuits in series and to said starter circuit output lead for setting an information bit in said counter circuits, advance pulse applying means connected between said first pulse generator and said first counter for propagating said information bit in said first counter to register the number of pulses in said trains of pulses, intertrain pulse applying means connected between said second pulse generator and said second counter for propagating said information bit in said second counter to register the number of trains of pulses, coincident logic gating means, and output means connected to both of said counters and responsive to an intertrain pulse from said second pulse generator following receipt in said address system of a predetermined permutation of pulses appearing in a predetermined number of pulse trains for applying output signals coincident in time to said logic means.

13. In an address recognition system for receiving dial pulse trains including one pulse train being a code representation for a starter digit and further pulse trains being a predetermined number of significant identifying digits wherein said pulse trains are separated by interdigital pauses of greater time duration than the interpulse pauses, the combination comprising input means for receiving substantially unlimited combinations of code representations from a remote transmitting point for said significant identifying digits, an address recognition circuit adapted to respond to a unique one of said unlimited code designations, said address recognition circuit comprising pulse generating means connected to said input means, said pulse generating means comprising two oscillator circuits having different oscillatory periods for producing two separate and spaced advance pulses for each dial pulse received, and a control pulse generator for generating pulses, one each for each interdigital pause and subsequent to the latest pulse in time generated by said two oscillator circuits, a starter circuit comprising a first shift register and a first coincident logic gate having signal conducting means connected therebetween, means connecting inputs of said starter circuit shift register to said pulse generating means, said starter circuit shift register being responsive to receipt therein of one of said control pulses generated preceding said start digit and two of said advance pulses and one of said control pulses generated subsequent to said starter digit for establishing a read-out signal on said signal conducting means, second and third shift registers, activating means controlled by said starter circuit logic gate during the coincidence of said read-out signal and said subsequent one of said control pulses for activating said second and third shift registers, first pulse applying means connected between said two oscillator circuits of said pulse generating means and said second shift register to advance the count of said shift register to a count equal to the number of pulses in said dial pulse trains, second pulse applying means connected between said control generator and said third shift register to advance the count of said shift register in response to said control pulses from said control generator to a count equal to the number of pulse trains in said code representation, a second logic gate, and output means connected from predetermined readout stages in said second and third shift registers to said second logic gate, said predetermined stages in said second and in said third shift registers coincidentally operative in response to an interdigital pulse generated subsequent to the last train of pulses in said code representation for placing coincident signals on said output means.

References Cited by the Examiner

UNITED STATES PATENTS

| | | | |
|---|---|---|---|
| 2,648,831 | 8/1953 | Vroom | 340—164 |
| 3,046,526 | 7/1962 | Scantlin | 340—164 |
| 3,064,236 | 11/1962 | Coleman | 340—164 |
| 3,080,547 | 3/1963 | Cooper | 340—164 |
| 3,201,756 | 8/1965 | Young | 340—164 |
| 3,226,679 | 12/1965 | Malone | 340—164 |
| 3,252,142 | 5/1966 | Takenaka | 340—164 |

NEIL C. READ, *Primary Examiner.*

P. XIARHOS, D. YUSKO, *Assistant Examiners.*